Oct. 9, 1928.

G. B. RIDLEY 1,686,989

CLUTCH

Filed Jan. 18, 1926

INVENTOR
GRAHAME B. RIDLEY
by White & Prost
his ATTORNEYS

Patented Oct. 9, 1928.

1,686,989

UNITED STATES PATENT OFFICE.

GRAHAME B. RIDLEY, OF SAN FRANCISCO, CALIFORNIA.

CLUTCH.

Application filed January 18, 1926. Serial No. 81,919.

My invention relates to clutches and particularly to clutches of the yielding type.

An object of my invention is to provide a clutch for gradually engaging shafts operating at different speeds.

Another object of my invention is to provide a clutch offering a non-frictional resistance to relative rotation of the members it clutches.

Another object of my invention is to provide a clutch which will prevent damage to the engaging members.

A further object of my invention is to provide means for keeping a clutch collar in engaged or disengaged position.

The invention possesses other advantageous features, some of which with the foregoing, will be set forth at length in the following description, where I shall outline in full that form of the clutch of my invention which I have selected for illustration in the drawings accompanying and forming part of the present specification. In said drawings I have shown one form of clutch embodying my invention, but it is to be understood that I do not limit myself to such form since the invention, as set forth in the claims, may be embodied in a plurality of forms.

Figure 1:
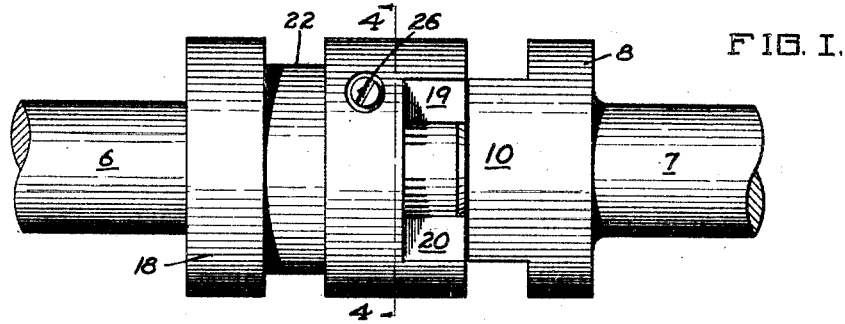
Figure 1 is a side elevation of my clutch in disengaged position.

Broadly speaking, the clutch of my invention preferably comprises resilient means, such as spring-pressed balls, mounted in one clutch member and adapted to engage periodically means, such as grooves, in another clutch member so that relative rotation of the two members is resisted.

My clutch is adapted for use in connecting two shafts revolving at different speeds and especially if the driven shaft is carrying a load. In the past, friction clutches have been employed in such circumstances but friction always produces wear and friction clutches used where the duty is heavy are short lived. Friction clutches are also disadvantageous in that they require more or less precise operation to insure smooth engagement of the two clutch members.

To overcome the above disadvantages, I provide in the preferred form of my invention, which is illustrated in the drawings, a driving shaft 6 in axial alignment with a driven shaft 7. The end of the driven shaft is enlarged into a radial flange 8 which is provided on its face with two opposed quadrant lugs 9 and 10. The end of the driving shaft is perforated by two diametric apertures 12 and 13 spaced apart axially and lying in the same plane. Each of the apertures contains two balls 16 and 17 pressed outwardly by means of an interposed coil spring 14.

Surrounding the end of the driving shaft is a sleeve or collar 18 provided on one face with opposed quadrant lugs 19 and 20 which are adapted to engage and disengage the lugs 9 and 10 when the collar is shifted axially on the shaft 6. Any convenient means may be used for shifting the collar on the shaft and in this form of the invention, a circumferential groove 22 is provided on the collar which may be engaged by the forks of a shifting lever, not shown. The interior surface of the collar is interrupted by two diametrically opposed lingitudinal grooves 23 and 24 which are of slightly greater radius than the balls 16 and 17 and are slightly less than a semicircle in compass.

A pin 26 is seated in the collar and passes transversely through one of the grooves 23 and 24. The pin is of such diameter and is so disposed axially of the collar, that it lies on one side of the balls 16 and 17 when the collar is in engaged position and on the other side of the balls when the collar is in disengaged position.

The shaft 6 has been designated a driving shaft merely for convenience of description, and it is obvious that either shaft 6 or shaft 7 may be the driving shaft without affecting the operation of my clutch.

Figure 2:
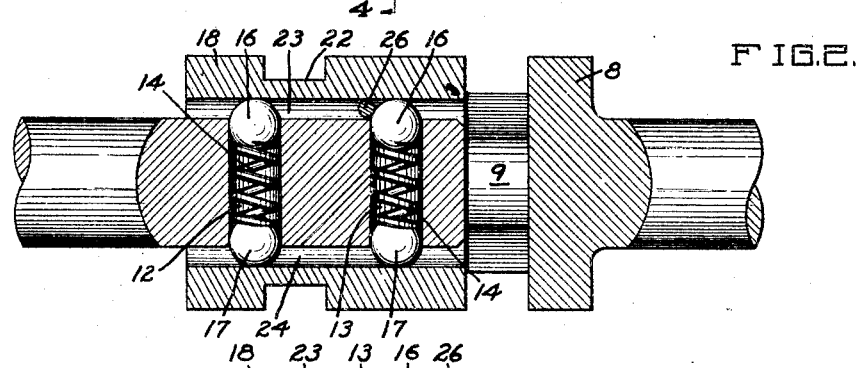
Fig. 2 is a longitudinal section of my clutch in disengaged position, the section being taken on the line 2—2 of Fig. 6.
Figure 3:
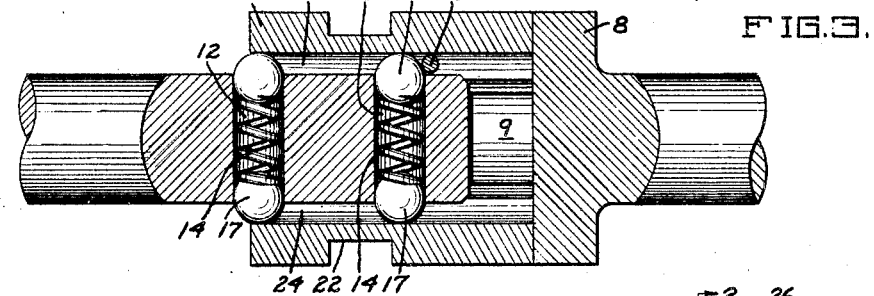
Fig. 3 is a longitudinal section of my clutch in engaged position.
Figures 4, 5, 6:
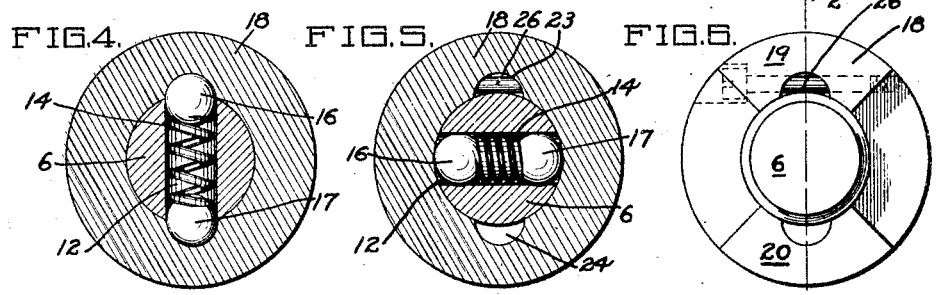
Fig. 4 is a transverse section of my clutch taken on the line 4—4 of Fig. 1.
Fig. 5 is a transverse section of my clutch taken on the line 4—4 of Fig. 1 but with the spring-pressed balls not seated in the grooves.
Fig. 6 is an end elevation of my clutch.

Assume that the driving shaft 6 is revolving rapidly and that the shaft 7 is stationary and is connected to a load, such as a fly wheel. The clutch is in disengaged position with the collar 18 disposed as shown in Figs. 1 and 2. It is desired to engage the shafts 6 and 7 and bring the shaft 7 up to the speed of the shaft 6. In the disengaged position of the collar, the balls 16 and 17 are held in the grooves 23 and 24 by pressure exerted by springs 14. The pin 26 lies to one side of the ball 16 retaining the collar in disengaged position. To engage the lugs 19 and 20 of the collar 8 with the lugs 9 and 10 of the shaft 7, the collar is shifted axially on the shaft by means such as a forked shifting lever. As the collar is shifted into engaged position, the pin 26 depresses the ball 16 and passes over it, after which the ball returns to its place in the groove 23 and retains the collar in engaged position.

Owing to the inertia of shaft 7, a large force is required to accelerate it to the speed of shaft 6. This force turns the collar with respect to the shaft 6, forcing the balls 16 and 17 inward against the spring pressure. The pressure of the springs 14 is sufficient to offer considerable resistance to the turning of the collar on the shaft 6 and serves to bring the shaft 7 up to speed gradually, the balls over-running, that is, periodically dropping into and being forced out of the grooves until the shaft 6 and shaft 7 are revolving synchronously. If the torque necessary to turn the shaft 7 is too great, however, the balls will continue to over-run, thereby preventing an overloading of the driving mechanism.

It is thus seen that the clutch of my invention provides a non-friction means for presenting a resistance to the relative rotation of two shafts and allow smooth and positive engagement of the members it clutches.

I claim:

1. A clutch comprising two axially aligned shafts, a collar rotatably mounted on the first shaft and adapted to be axially shifted to engage the second shaft, said collar being provided with interior longitudinal grooves, spring pressed balls mounted on said first shaft and adapted to seat in said grooves, and means cooperating with said balls for resisting axial shifting of said collar.

2. A clutch comprising a driving shaft having an aperture diametrically therethru, a driven shaft, lugs on said driven shaft, a collar provided with interior longitudinal grooves mounted on said driving shaft and adapted to be axially shifted thereon, lugs on said collar to interengage the lugs on said driven shaft, a spring mounted in said aperture, balls in said aperture at the ends of said spring and normally pressed thereby into said grooves, and a pin passing transversely thru one of said grooves and adapted to depress one of said balls when said collar is axially shifted.

In testimony whereof, I have hereunto set my hand.

GRAHAME B. RIDLEY.